United States Patent [19]

Meywald

[11] Patent Number: 4,905,974

[45] Date of Patent: Mar. 6, 1990

[54] DRAW-DOWN JAW

[76] Inventor: Günter Meywald, Rosenweg 5, 3548 Arolsen, Fed. Rep. of Germany

[21] Appl. No.: 256,961

[22] Filed: Oct. 13, 1988

[30] Foreign Application Priority Data

Oct. 14, 1987 [DE] Fed. Rep. of Germany ....... 3734780

[51] Int. Cl.[4] ............................................ B23B 31/18

[52] U.S. Cl. ................................................... 269/135

[58] Field of Search ............... 269/134, 135, 239, 277, 269/278; 279/123, 106

[56] References Cited

U.S. PATENT DOCUMENTS

| | | | |
|---|---|---|---|
| 1,692,398 | 11/1928 | Weaver et al. | 269/135 |
| 2,509,888 | 5/1950 | Schulz | 269/239 |
| 2,760,535 | 8/1956 | Mertz | 269/137 |
| 3,512,769 | 5/1970 | Pendry et al. | 269/135 |
| 4,039,115 | 8/1977 | Randolph et al. | 269/135 |
| 4,353,561 | 10/1982 | Peterson | 269/134 |
| 4,431,202 | 2/1984 | Swenson | 279/123 |

FOREIGN PATENT DOCUMENTS

| | | |
|---|---|---|
| 910280 | 4/1954 | Fed. Rep. of Germany . |
| 383727 | 10/1964 | Fed. Rep. of Germany . |
| 1807060 | 11/1967 | Fed. Rep. of Germany . |
| 1279569 | 10/1968 | Fed. Rep. of Germany . |
| 1911485 | 10/1969 | Fed. Rep. of Germany . |
| 2318147 | 10/1974 | Fed. Rep. of Germany . |
| 1286978 | 1/1989 | Fed. Rep. of Germany . |

OTHER PUBLICATIONS

Western Electric, Technical Digest, No. 22, "Clamp", Behrens et al., Apr. 1971.

*Primary Examiner*—Robert C. Watson
*Attorney, Agent, or Firm*—Thomas & Kennedy

[57] ABSTRACT

Draw-down jaw for fitting in vises equipped with a bearing jaw (6) and a clamping jaw (7), the clamping jaw being able to execute a drawing-down motion with respect to the bearing jaw for applying the gripping force. The clamping jaw (7) is mounted on the bearing jaw (6) pivotally about a horizontal pivot axis (8), which is arranged in the upper region of the bearing jaw (6). The clamping jaw (7) has on its side facing toward the workpiece (4) a gripping edge (9) or gripping surface, to which their adjoins upwardly a plane gripping surface (10) and downwardly a free surface (11). The restoring springs are designed as compression springs (12) and thus for absorbing the gripping forces in the elastic range.

6 Claims, 1 Drawing Sheet

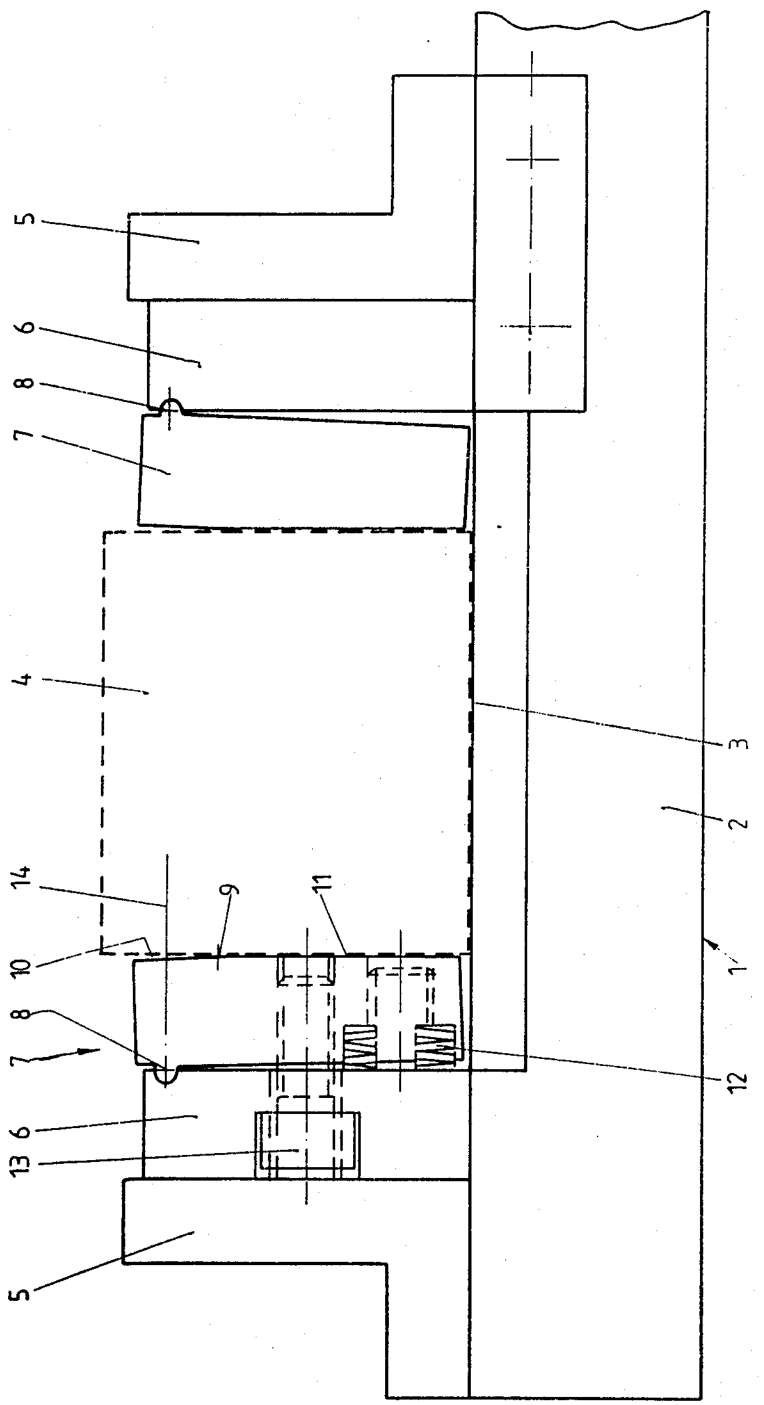
5
6
8
7
4
3
2
14
9
11
10
8
7
1
12
6
13
5

DRAW-DOWN JAW

FIELD OF THE INVENTION

The invention relates to a draw-down jaw for fitting in vises with a bearing jaw and a clamping jaw, the clamping jaw executing a drawing-down motion with respect to the bearing jaw when the gripping force is applied, and with restoring springs acting between bearing jaw and clamping jaw. During the gripping of workpieces having a more or less rectangular cross-section in a vise, essentially a horizontally acting gripping force is applied to the workpiece, the clamping jaws, which are in turn horizontally disposed, acting on the workpiece. A vise has, furthermore, a bearing surface for the workpiece and it has always been endeavoured in gripping of the workpiece also to exert a downward draw on the workpiece, i.e. to press the workpiece vertically from top to bottom onto the bearing surface.

BACKGROUND OF THE INVENTION

A draw-down jaw known from German Patent Specification No. 910,280 has a bearing jaw and a clamping jaw, an inclined plane being provided between bearing jaw and clamping jaw which is designed and arranged in such a way that the clamping jaws acting on the workpiece with parallel and vertically arranged gripping surfaces execute a certain motion downwards in the direction of the bearing surface for the workpiece when the gripping force is applied, and thereby bring about the downward draw. During this operation the clamping jaws are displaced obliquely downwards parallel to themselves. In conjunction with the inclined plane, restoring springs are provided which guide the clamping jaws back into their initial position on the bearing jaws when the gripping force is removed. These restoring springs are often dimensioned comparatively weakly. In order to be able to use strong spring forces, the restoring of the clamping jaws is limited by a stop. In the machining of a workpiece in the vise, coolants are often used, which then also flow off over the vise and the gripping jaw as well as the bearing jaw. These coolants tend to make the inclined plane stick, so that the restoring springs are no longer able to bring about the initial position. In such a state, the work piece can only continue to be gripped horizontally and there is no downward draw. For proper functioning, it is therefore necessary to keep the inclined plane between bearing jaw and clamping jaw clean and to oil it. Good functioning therefore requires appropriate maintenance. The arrangement of a seal covering the guide surfaces at the inclined plane also counteracts these disadvantages. Under high gripping pressures, the frame of the vise distorts in the elastic range. As a result, the parallelism of the gripping surfaces of the clamping jaws is lost and the workpiece is horizontally gripped relatively low down, that is in the region of the bearing surface, while in the upper region it is held little or not at all. In this case as well, the downward draw is completely or partly lost.

For the gripping of workpiece of irregular surface, in particular in the case of a trapezoidal cross-section, it is known to use swing jaws. In this arrangement, a plane clamping jaw is suspended so as swing about an axis on the vise, i.e. it rests against the workpiece according to its oblique surface during the gripping operation. As a rule, only a horizontally acting gripping force comes to bear in this case. A downward draw is not intended and, if at all, comes about coincidentally if the workpiece surface happens to be shaped accordingly.

Furthermore, roller draw-down jaws are known which have a two-part jaw. The part of the jaw which faces away from the workpiece bears an inclined plane. The part of the jaw which faces toward the workpiece is equipped with a roller mounted on it which acts simultaneously on the workpiece and on the inclined plane. Such roller draw-down jaws serve for the gripping of workpieces having angle errors. During the gripping operation, the roller rolls downwards on the inclined plane and at the same time on the workpiece. Since the direction of rotation of the roller is predetermined by the inclined plane, a corresponding downward draw is also achieved.

These known gripping jaws may either be fitted directly when equipping a vise, and thus be used with it. But it is also possible to design these jaws in such a way that they can be subsequently fitted in a vise with gripping jaws present there, or it can be hooked thereupon.

SUMMARY OF THE INVENTION

The invention is based on the object of designing a draw-down jaw for fitting in vises of the type described at the beginning in such a way that, in particular under high gripping pressures, an area contact of the clamping jaws against the workpiece remains even if the frame of the vise elastically distorts. In this case, as before, a corresponding downward draw is to be effected.

This is achieved according to the invention by the fact that the clamping jaw is mounted on the bearing jaw pivotally about a horizontal pivot axis, which is arranged in the upper region of the bearing jaw, that the clamping jaw has on its side facing toward the workpiece a gripping edge or a gripping surface which is arranged underneath a horizontal plane defined by the pivot axis and to which there adjoins upwardly a plane gripping surface and downwardly a free surface, and that the restoring springs are designed as tension springs and thus for absorbing the gripping forces in the elastic range. The new draw-down jaw deliberately grips in two ranges, that is initially in the elastic range and then, once the forces of the tension springs have been used up, rigidly. While in the elastic range, only the gripping edge or gripping surface acts on the workpiece, the plane gripping surface adjoining the gripping edge or gripping surface comes into contact with the workpiece once the force and travel of the compression springs has been used up. At this moment, the downward draw has already acted accordingly and is also preserved during the rigid gripping. The plane gripping surface comes into area contact with the workpiece having a correspondingly rectangular cross-section. Consequently, a defined downward draw is brought about in the elastic range, which is preserved in the rigid range of gripping. The compression springs are dimensioned considerably stronger and larger than the restoring springs in the prior art in order to bring about quite deliberately an elastic gripping range, which is necessary for the downward draw. With the stronger dimensioning of the tension springs, a considerably higher operational reliability is achieved. The adhering characteristic of the coolant can no longer have an adverse effect, even without arrangement of a seal. The chips inevitably generated during machining also have no disruptive effect. The free surface must be arranged and designed in such a way that it also does not come into contact with the workpiece during the rigid gripping. The gripping edge or gripping surface, which may also be designed as a curve, is provided underneath a horizontal plane defined by the pivot axis. There then adjoins upwardly the plane gripping surface, which is advantageous to the extent that the workpiece is gripped relatively high up, that is away from the bearing surface on the vise.

The compression springs are expediently designed such that they can be set in their force, in order to be able to fix or set the transition point from elastic gripping to rigid gripping.

The position of the gripping edge or gripping surface relative to the pivot axis is matched to the position and dimensioning of the tension springs. Here too, the lever principle applies. The tension springs may preferably be designed as conically shaped cup springs, allowing relatively great gripping forces to be realized in the elastic range with a small space requirement. But it is also by all means possible to use cylindrically wound helical springs.

It is, furthermore, expedient to provide a screw as stop for limiting the extension of the compression springs, the arrangement and design of this stop also affecting the arrangement and design of the free surface. The stop may thus be designed such that it can be adjusted and set, in order to be able to set in this way the displacement of the downward draw.

For forming the horizontal pivot axis between bearing jaw and clamping jaw, a cross-sectionally halfround continuation may be provided on the one jaw and a corresponding groove provided on the other jaw. Such a design allows the transfer of considerable forces, such as are necessary in particular in the range of the rigid gripping.

The design of the free surface is matched to the travel of the extension of the gripping jaws. It is generally sufficient to provide the angle of the free surface in an order of magnitude of about 2°.

BRIEF DESCRIPTION OF THE DRAWINGS

The invention is described further with reference to a preferred exemplary embodiment of the drawdown jaw. The FIGURE shows a side view of the essential parts of a vise with draw-down jaws.

DETAILED DESCRIPTION

In the FIGURE, the parts of a vise 1 essential for the invention are shown, which vise has a frame 2, on or in which a bearing surface 3 is formed for a workpiece 4, indicated by broken lines. Mounted in guided manner on the frame 2 are conventionally present gripping jaws 5, which can be moved by a drive (not shown) toward each other in the sense of gripping or can be moved apart for opening of the vise. These gripping jaws 5 are also present if such a vise is to be retrofitted with the new draw-down jaws. It is, of course, also possible to equip the vise 1 without these gripping jaws 5 and from the outset with the new draw-down jaws.

The new draw-down jaws each have a bearing jaw 6 and a clamping jaw 7. The bearing jaws 6 have approximately rectangular cross-section. On them, a pivot axis 8 is realized, about which it is possible to pivot the clamping jaws 7 relative to the bearing jaws 6 through a usually small angle. The clamping jaws 7 have on their side facing toward the workpiece 4 a non-plane surface, which is made up specifically of a gripping edge 9, a plane gripping surface 10 adjoining on one side and a free surface 11 adjoining on the other side. The gripping edge 9 may, of course, also be designed as an area, that is in the form of a gripping area or gripping curve which extends vertically over a certain region. What is essential is that this gripping edge or gripping surface 9 merges on the one side with the plane gripping surface 10 and on the other side with the free surface 11. The arrangement is made in this case in such a way that the plane gripping surface 10 is not in alignment with the free surface 11, instead an angle other than 180° is formed between the two, which angle is, in the exemplary embodiment of the figure, greater on the side facing toward the workpiece.

Between each bearing jaw 6 and associated clamping jaw 7 there are arranged and engaged tension springs 12, the force of which determines the gripping force in the elastic range. Furthermore, a screw 13 is provided between bearing jaw 6 and clamping jaw 7, which screw forms a stop for the extension springs 12 which can be set. In this way, the clamping jaw 7 can be set in the elastic clamping range.

The FIGURE shows the relative position of the parts when the workpiece 4 is rested on the bearing surface 3 for the purpose of gripping, and the clamping jaws 7 have approached each other to such an extent that, with the gripping edge 9 (and—depending on the setting of the screw 13—also at the same time with the free surfaces 11), they come into contact with the workpiece 4. On further approachment of the clamping jaws 7 toward each other and against the workpiece 4, first of all the elastic gripping range is passed through, in which the spring travel of the compression springs 12 is used up. In this case, the clamping jaw 7 pivots about the pivot axis 8. It can be seen that the gripping edge 9 is arranged underneath a horizontal plane 14 defined by the pivot axis 8, so that the gripping edge 9 moves on a corresponding arc which is directed downward, so that the required downward draw occurs on the elastic gripping. The workpiece is thus here already pressed onto the bearing surface 3 on the frame 2, the horizontal gripping force of course also being applied at the same time. Once the compression travel of the compression springs 12 has been used up, the transition of the gripping from the elastic range to the rigid range takes place, i.e. gripping can be carried out still further and still more strongly. At the same time, in this transition, the plane gripping surface 10 of each clamping jaw 7 comes into contact with the workpiece 4, while during the course of the elastic gripping the free surface 11 has moved increasingly away from the workpiece. Only the gripping edge 9 remains in contact with the workpiece 4 throughout the entire gripping. The application of the plane gripping surface 10 is, however, by all means desirable, because, as a result, the workpiece 4 is held in the upper region and the force transfer in the rigid gripping range takes place over a comparatively large area. Since the plane gripping surface 10 is also arranged somewhat obliquely with respect to the vertical, as a result the elastic extension of the frame 2 under these high gripping pressures can also be countered in the rigid range.

When the gripping force is released, the process proceeds in the opposite sequence, that is in such a way that finally the compression springs 12 finally assume their maximum extension, as set by the spring 13. The downward draw is ceased and the workpiece 4 comes free. At the same time, however, the clamping jaws 7 are again in the initial position, that is ready for receiving and gripping a workpiece 4.

I claim:

1. A draw-down jaw for fitting in vises with a bearing jaw and a clamping jaw, the clamping jaw executing a drawing-down motion with respect to the bearing jaw when the gripping force is applied, and with restoring springs acting between bearing jaw and clamping jaw, wherein the clamping jaw (7) is mounted on the bearing jaw (6) pivotally about a horizontal pivot axis (8), which is arranged in the upper region of the gearing jaw (6), wherein the clamping jaw (7) has on its side facing toward the work piece (4) a gripping edge (9) which is arranged underneath a horizontal plane defined by the pivot axis and to which there adjoins upwardly a plane gripping surface (10) and downwardly a free gripping surface (11), wherein said gripping surfaces are adapted to be moved into contact with a work piece and said free gripping surface is adapted to tilt out of contact with said work piece as said plane gripping surface is moved into contact with said work piece, and wherein the restoring springs are compression springs (12) positioned with respect to said bearing jaw and clamping jaw for absorbing the gripping forces as the free gripping surfaces move out of contact with the work piece.

2. A draw-down jaw as claimed in claim 1, wherein the compression springs (12) are designed such that they can be set their force.

3. A draw-down jaw as claimed in claim 1 wherein the compression springs (12) are designed as conically shaped cup springs.

4. A draw-down jaw as claimed in claim 1 wherein a screw (13), which is arranged between clamping jaw (7) and bearing jaw (6), is provided as stop for limiting the extension of the compression springs.

5. A draw-down jaw as claimed in claim 1, wherein, for forming the horizontal pivot axis (8) between bearing jaw (6) and clamping jaw (7), a cross-sectionally half-round continuation is provided on the one jaw and a corresponding groove is provided on the other jaw.

6. A draw down jaw for fitting between the gripping jaws or vises or the like comprising:

a pair of bearing jaws and a pair of clamping jaws positioned between said bearing jaws for engaging a work piece to be positioned between said clamping jaws, mounting means connecting together each clamping jaw and its adjacent bearing jaw about a horizontal pivot axis, spring means biasing the lower portion of each clamping jaw below the horizontal pivot axis away from its bearing jaw and toward engagement with the work piece, said clamping jaws each having a face oriented toward the work piece including a substantially plane gripping surface at the level of said pivot axis, a gripping edge positioned below said level of said pivot axis and merging with said plane gripping surface, and a free surface below and merging with said gripping edge, whereby when the bearing jaws and clamping jaws are progressively moved into compressive engagement with a work piece between the clamping jaws the free surfaces of the clamping jaws first engage the opposite sides of the work piece and the clamping jaws progressively tilt about their respective pivot axes against the bias of the spring means to draw down the work piece until the plane gripping surfaces of the clamping jaws are in abutment with opposite sides of the work piece.

* * * * *